(12) United States Patent
Rumph

(10) Patent No.: US 6,443,613 B1
(45) Date of Patent: Sep. 3, 2002

(54) METHOD FOR TRANSPORTING AND DELIVERING SUBSTANCES

(75) Inventor: Robert Rumph, Sumter, SC (US)

(73) Assignee: The Maitland Company, Sumter, SC (US)

( * ) Notice: Subject to any disclaimer, the term of this patent is extended or adjusted under 35 U.S.C. 154(b) by 0 days.

(21) Appl. No.: 09/456,444

(22) Filed: Dec. 8, 1999

(51) Int. Cl.⁷ .................................................. B01F 15/02
(52) U.S. Cl. ........................ 366/348; 406/146; 406/48; 366/264; 366/270
(58) Field of Search ................................. 366/262, 263, 366/264, 270, 241–252, 348; 422/227; 416/189; 105/247; 406/137, 136, 134, 135, 48, 146

(56) References Cited

U.S. PATENT DOCUMENTS

| 1,351,352 A | | 8/1920 | Stevens |
| 1,510,514 A | | 10/1924 | Walker |
| 1,592,713 A | | 7/1926 | Bendixen |
| 1,652,960 A | * | 12/1927 | Snelling et al. |
| 1,733,244 A | | 10/1929 | Smith |
| 1,854,761 A | | 4/1932 | Perkins |
| 1,891,122 A | * | 12/1932 | Urch |
| 1,896,616 A | * | 2/1933 | Gillican |
| 2,077,445 A | | 4/1937 | Wallace et al. |
| 2,108,416 A | * | 2/1938 | Smith et al. |
| 2,440,397 A | | 4/1948 | Erickson |
| 2,519,657 A | | 8/1950 | Hunter |
| 2,573,521 A | | 10/1951 | Wasley et al. |
| 2,767,965 A | | 10/1956 | Daman |
| 2,791,406 A | * | 5/1957 | Bates |
| 2,852,581 A | | 9/1958 | Stiles |
| 2,859,259 A | | 11/1958 | Stiles |

(List continued on next page.)

OTHER PUBLICATIONS

U.S. patent application Ser. No. 09/456,443, filed Dec. 8, 1999 [Attorney Docket No. 05092.0025].

Primary Examiner—Tony G. Soohoo
(74) Attorney, Agent, or Firm—Finnegan, Henderson, Farabow, Garrett & Dunner, L.L.P.

(57) ABSTRACT

The invention includes a method of minimizing the delivery cost of a slurry. According to the invention, a mobile tank is incompletely loaded with an at least partially dehydrated component of the slurry. Sufficient room is left in the tank for a diluent to be later added and the slurry constituted in the mobile tank. The incompletely loaded mobile tank is transported to a destination, thereby obviating expense associated with transporting a diluent portion of the slurry. At the destination, diluent is added to the tank and the slurry is constituted by activating a mechanical agitator within the tank. Slurry is then off-loaded from the mobile tank.

29 Claims, 2 Drawing Sheets

U.S. PATENT DOCUMENTS

| | | | |
|---|---|---|---|
| 2,903,344 A | | 9/1959 | Rollman et al. |
| 2,920,124 A | | 1/1960 | Stiles et al. |
| 2,950,171 A | | 8/1960 | Macq |
| 3,189,080 A | | 6/1965 | Overcashier et al. |
| 3,201,175 A | * | 8/1965 | Keves et al. |
| 3,257,174 A | | 6/1966 | Fournell |
| 3,316,023 A | * | 4/1967 | Koranda |
| 3,338,635 A | * | 8/1967 | Koranda |
| 3,375,942 A | * | 4/1968 | Boram |
| 3,451,724 A | * | 6/1969 | Cappelli et al. |
| 3,512,842 A | * | 5/1970 | Milewski et al. |
| 3,532,327 A | | 10/1970 | Landberg |
| 3,606,036 A | * | 9/1971 | Beebe et al. |
| 3,606,479 A | * | 9/1971 | Robinson et al. |
| 3,693,795 A | * | 9/1972 | Robinson et al. |
| 4,378,165 A | | 3/1983 | Landberg |
| 4,571,090 A | | 2/1986 | Wheetman et al. |
| 4,663,039 A | * | 5/1987 | Lindorfer et al. |
| 4,715,721 A | * | 12/1987 | Walker et al. |
| 4,844,664 A | * | 7/1989 | Turska |
| 5,013,530 A | * | 5/1991 | McGregor |
| 5,222,512 A | * | 6/1993 | McGregor |
| 5,275,487 A | | 1/1994 | Rumph |
| 5,282,681 A | * | 2/1994 | Supelak |
| 5,340,213 A | | 8/1994 | Rumph |
| 5,366,289 A | * | 11/1994 | Supelak |
| 5,385,402 A | | 1/1995 | Rumph |
| 5,395,593 A | | 3/1995 | Martin |
| 5,489,152 A | | 2/1996 | Rumph |
| 5,626,423 A | | 5/1997 | Rumph ........................ 366/270 |
| 5,851,068 A | | 12/1998 | Rumph ........................ 366/348 |
| 5,919,377 A | * | 7/1999 | Chisholm et al. |
| 6,276,825 B2 | * | 8/2001 | Running et al. |
| 6,276,826 B1 | * | 8/2001 | Rumph |

* cited by examiner

METHOD FOR TRANSPORTING AND DELIVERING SUBSTANCES

BACKGROUND OF THE INVENTION

1. Field of the Invention

The invention relates to methods and apparatuses for delivering materials having liquid and solid constituents such as salt and clay slurries. The invention has particular applicability for hauling sodium chlorate and its precursor salts.

2. Description of the Related Art

Many industrial processes employ large quantities of slurries, such as solutions. By way of example only, in a paper manufacturing process, large quantities of sodium chlorate are used as a bleaching agent. Sodium chlorate is typically manufactured from granular sodium at a sodium chlorate plant. Usually, granules are delivered to the chlorate plant in dump trucks, and are dumped into mixing pits near the plant. Water is then added to the pits, and the contents of the pits are mixed to form a slurry before being pumped off to the sodium chlorate plant. This process is not only time consuming, but also labor intensive.

Alternatively, the slurry may be pre-made and delivered in tanker trailers to the sodium chlorate plant. This approach is costly and inefficient since the heaviest component of the slurry is water. In effect, the shipper is required to pay freight for essentially hauling water. And due to the weight of water, a mobile tanker might easily exceed government imposed weight restrictions before the tanker is completely full, leading to further inefficiency.

After sodium chlorate is manufactured, it may be transported to a paper mill as a slurry. However, since sodium chlorate slurry may be appropriately 55% water by weight, doing so is costly and efficient for the reasons discussed earlier.

Due to the expense and inefficiency of transporting slurries, some shippers have resorted to hauling powdered sodium chlorate in rail cars and then adding water at the paper mill using a sparger system.

With a sparger system, a pump, external to the rail car, conveys water into the rail car while another pump conveys a mixture of liquid and solid from the rail car to an external mixing tank. Sparger systems do not typically employ any mechanical agitation in the tank. Rather, a sparger system continuously swaps the contents of the mixing tank and the rail car in an attempt to place all of the sodium chlorate into slurry form. There are a number of draw backs with sparger systems. First, they are time consuming to use. It typically takes about one half of a work day to turn a single rail car of dry sodium chlorate into slurry form. Second, sparger systems are typically not fully effective. Sometimes as much as 10 percent of a sodium chlorate load will not become slurry and will cake on the bottom of the mobile tank in which it is transported. In addition, the sparger system requires external equipment and excessive labor.

SUMMARY OF A FEW ASPECTS OF THE INVENTION

Accordingly, the present invention is directed to apparatuses and methods for minimizing the delivery cost of slurries, substantially obviating one or more of the limitations of the related art.

In a broader sense, the invention is directed to methods and apparatuses for making mixtures of solids and liquids or for suspending solids in liquids.

In accordance with the purposes of the invention, as embodied and broadly described herein, the invention includes a method wherein a mobile tank is incompletely loaded with an at least partially dehydrated component of a slurry. Sufficient room is left in the tank for a diluent to be later added and the slurry constituted in the mobile tank. The incompletely loaded tank is transported to a destination thereby obviating the expense associated with transporting the diluent portion of the slurry. At the destination, the diluent is added to the mobile tank and the slurry is constituted by activating a mechanical agitator within the mobile tank. After the slurry is constituted, it is off-loaded from the tank.

Although the method of the invention is not limited to any particular form of mechanical agitator, the invention may include an elongated conduit having a top end and a bottom end, the conduit having a propeller therein for drawing diluent from the top end and directing it towards the bottom end. When the propeller is activated, it initially draws liquid from the top of the load through the top end of the conduit and expels it at the bottom of the solids layer. This undermines the solids to provide quick blending, minimizing the opportunity for solids to remain unmixed.

In addition to the above, the invention may include one or more of the following aspects either alone or in combination with other elements:

- various conduit configurations in a tank to facilitate the flow of a material from an upper region to a lower region,
- a propeller encased with a conduit in a tank,
- a fluid conveyer including rotating blades in a conduit,
- a shaft extending through a conduit to drive at least one blade located in the conduit,
- conveying fluid from an upper to a lower region of a tank at a rate of at least approximately 500 gallons per minute, and preferably at least 10,000 gallons per minute.
- constituting a slurry in a mobile tank in which at least a portion of the slurry's precursors are transported,
- purposefully transporting a partially empty tank to a destination leaving room for diluent to be later added,
- sequentially activating motors in each of a plurality of tank compartments,
- undermining solids in a tank with a floor having one or more sloped regions,
- locating the mixing propeller of a fluid conveyor close to the floor of a tank,
- a compartmented tanker with an agitator in each compartment for separately mixing each compartment,
- employing multiple fluid conveyors in a single tank,
- employing a fluid conveyor in mobile road tankers, railcar tankers, stationary tanks, oceangoing vessels, other mobile vessels, or ISO containers,
- using any of the above apparatuses or methods to transport and constitute sodium chlorate and its precursor salts,
- using any of the above methods or structures in connection with slurries (including but not limited to clay and salt slurries), hazardous and nonhazardous waste, industrial mixtures, or any other mixture including those constituted from liquids an solid constituents, and
- any other novel and nonobvious combination disclosed or suggested in the Background of the Invention, this brief Summary of the Invention, the Drawings and their Brief Description, the Description of the Preferred Embodiments, and the appended claims.

It is to be understood that both the foregoing general description and the following detailed description are exemplary and are not intended to limit the scope of the invention, as claimed. The accompanying drawings are included to provide a further understanding of the exemplary embodiments and are incorporated in and constitute a part of this specification.

DESCRIPTION OF THE PREFERRED EMBODIMENTS

Reference will now be made in detail to preferred embodiments of the invention. Wherever possible, the same reference numbers are used in the drawings and the description to refer to the same or like parts.

Described herein are preferred embodiments of apparatuses and methods. For ease of discussion, a method will be described in connection with the apparatus illustrated in the appended figures. However, it should be noted that the inventive method in its broadest sense is not so limited. Other apparatus, including, but not limited to the apparatus described in U.S. Pat. Nos. 5,851,068, 5,626,423, 5,489,152, 5,385,402, 5,340,213, or 5,275,487 (each of which is incorporated herein by reference), may be used to practice methods in accordance with the invention.

Figure 1:
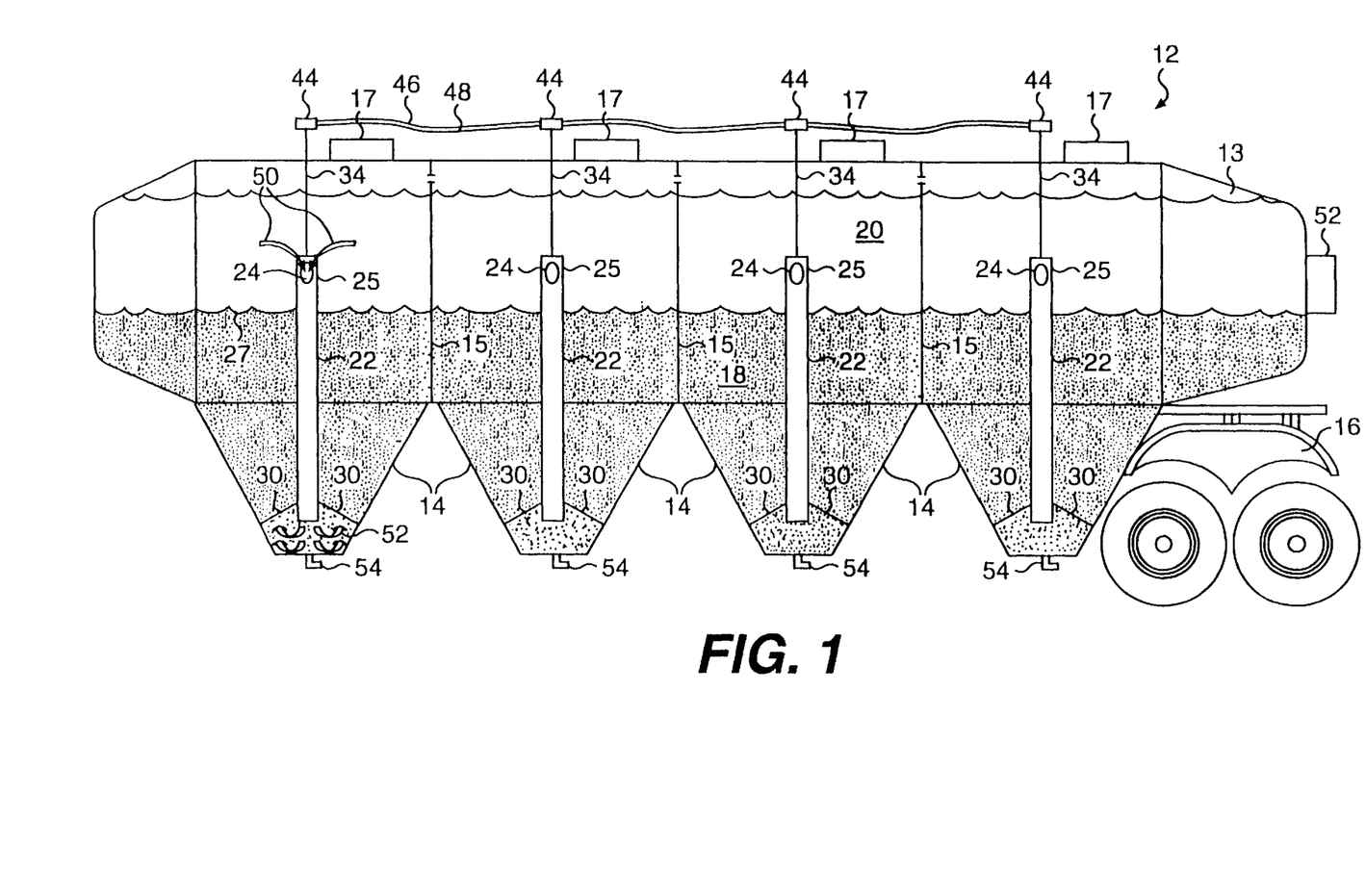
FIG. 1 illustrates a partially cross-sectioned side view of an agitator tanker trailer in accordance with the present invention.

FIG. 1 illustrates a dry bulk or pneumatic tanker trailer 12. Tanker trailer 12 includes a tank 13 having multiple floor cones 14 mounted on a wheeled chassis 16 enabling tank 13 to be transported overland by a conventional tractor (not shown). Typically, such a tank includes one or more manhole openings 17, located at the top of tank 13.

The interior of tank 13 may be thought of as generally being divided into two horizontal regions: a lower region 18 and an upper region 20. When the tanker trailer 12 is to be used to transport solid portions of a mixture and thereafter reconstitute the mixture at a destination, the lower region 18 is generally defined as that zone of tank 13 which holds the solid portions, and the upper region 20 is the zone of tank 13 that remains empty, to later receive a liquid portion of the mixture. Initially, when liquid is added to the tanker it will stratify on top of the solids. The general area of the boundary between liquids and solids is referred to herein as the phase boundary 27.

In a preferred embodiment, baffles 15 may vertically divide tank 13 into multiple compartments, each compartment having a single floor cone 14. Alternatively, one or more baffles 15 may be omitted. Indeed, the invention may include tanks without any vertical partitioning. When provided, baffles 15 isolate compartments from each other to facilitate thorough mixing which might otherwise be hampered if solids migrate from one compartment to another.

Tank 13 contains a series of conduits 22 extending from the upper region 20 to the lower region 18. As illustrated in greater detail in FIG. 2A, conduit 22 may include a series of inlet openings 24 in the upper region.20 and an outlet 26 in the lower region 18. Conduit 22 may be mounted within tank 13 via upper bracing 28 and lower bracing 30. This bracing maintains the conduit 22 in a fixed position relative to the walls and floor of the tank 13.

Preferably, conduits 22 are constructed of stainless steel, or an aluminum, or carbon steel tubing having an inside diameter of approximately 15¼ inches. Depending upon the design of the tank 13 and/or desired use, as few as one conduit may be employed within a single tank. While conduits 22 are illustrated with upper ends 25 fully contained within tank 13, it is contemplated that ends 25 could be configured to extend through the top of tank 13.

Figures 2A, 2B:
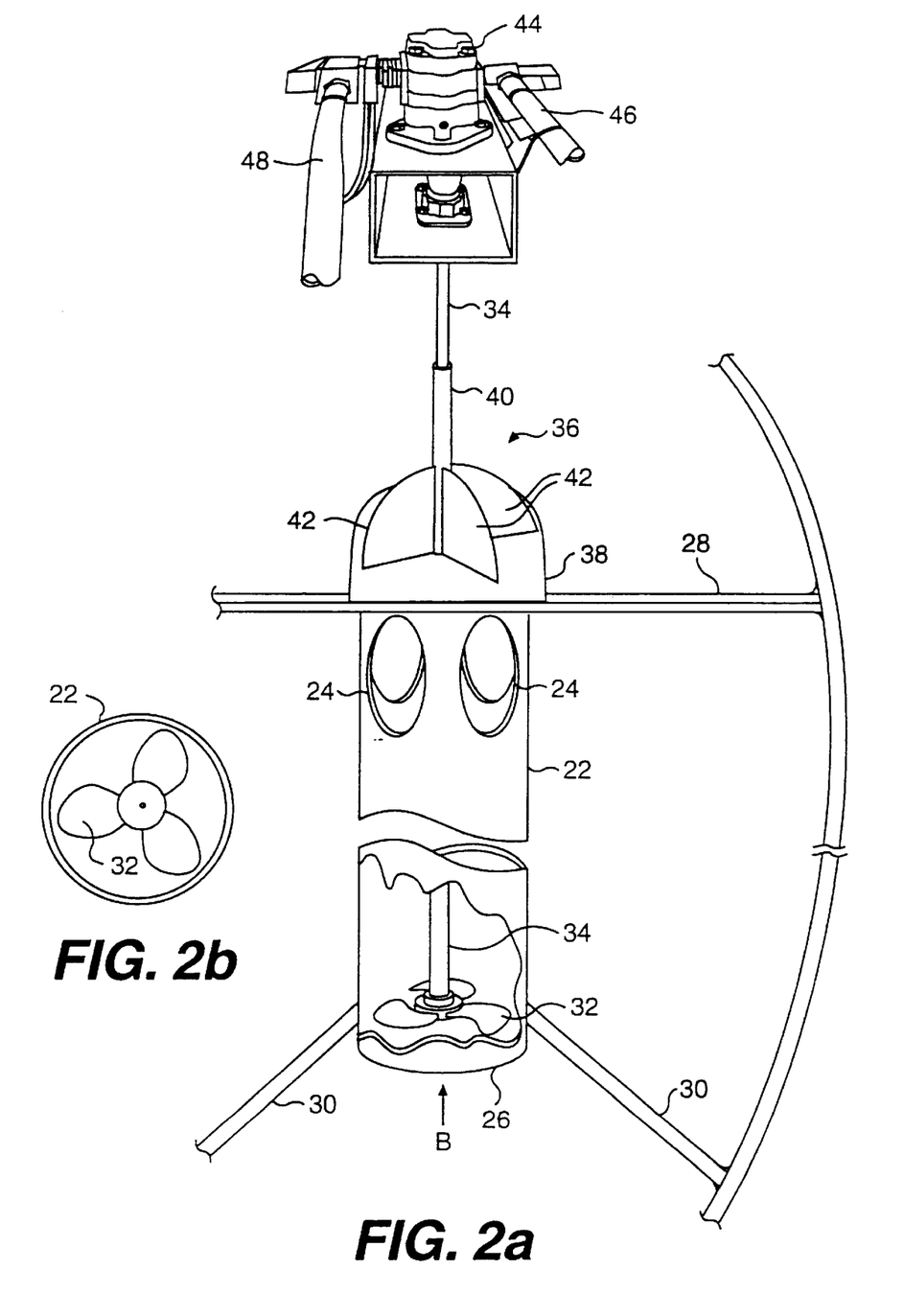
FIG. 2A is a detailed and partially cross-sectioned view of a portion of the agitator illustrated in FIG. 1.
FIG. 2B is a bottom view of the agitator of FIG. 2A.

Conduits 22 are part of a fluid conveyer adapted to propel fluid from the conduit inlet openings 24 in the upper region 20 to the conduit outlet 26 in the lower region 18. As best illustrated in FIGS. 2A and 2B, each fluid conveyor includes a propeller 32 located within each conduit 22. Preferably, propeller 32 is located proximate outlet 26. This arrangement permits propeller 32 to be located near the floor of tank 13 while ensuring that propeller 32 is shielded and thereby prevented from becoming encased in solids. By way of example, if the conduit has an inside diameter of 15¼ inches, a 15-inch diameter stainless steel boat prop may be suitably used as part of the fluid conveyor. Other alternatives such as a 16-inch propeller within a 17-inch conduit may also be used. Alternatively, other propellers such as high-volume pumps or other structures having one or more blades radiating from a hub may be employed.

A rotatable shaft 34 extends through conduit 22 and is coupled at one end to propeller 32, and at an opposite end to motor 44. To maintain concentric rotation of propeller shaft 34 within conduit 22, a shaft stabilizer 36 may be mounted at the top of conduit 22. Shaft stabilizer 36 includes top plate 38 welded to the top of conduit 22. An elongated guide tube 40 is welded to a shaft opening in top plate 38. Shaft 34 passes through top plate 38 and rotates in guide tube 40. Guide tube braces 42 are welded between guide tube 40 and top plate 38 in order to provide stability to the guide tube 40. By way of example, shaft 34 may be constructed from a 1¼-inch O.D. stainless steel rod, and guide tube 40 may be constructed of a stainless steel tube having an inside diameter of 2 inches. If desired, a lower shaft guide may be used inside conduit 22 to further ensure concentric rotation of propeller 32.

As mentioned, shaft 34 is coupled at its upper end to a motor 44 for rotating the shaft 34 and propeller 32. Various motors may be used including electrical or hydraulic motors, or combustion engine drive systems. As illustrated schematically in FIG. 1, hydraulic drive motors 44 are located on the exterior of tanker trailer 12 and are connected to a conventional hydraulic pump (not shown) via hydraulic lines 46 and 48. Alternatively, the drive motors may be internally positioned in tank 13. In a preferred embodiment, a Permco 3.5-cubic-inch hydraulic motor, may be used, which will rotate propeller 32 at approximately 1200 rpm to pump approximately 10,000 gallons per minute. Preferably, the fluid conveyor is configured to pump an average of at least 500 gallons per minute. Each hydraulic motor 44 may operate on a 30 GPM hydraulic flow at 2000 PSI.

Methods of the invention will now be described in connection with the apparatus of FIGS. 1, 2A, and 2B. Specifically, the invention includes a method of minimizing the delivery cost of a slurry. The term "slurry," as used herein, is intended to refer to any mixture of liquid and solid, regardless of consistency, including solutions constituted from powders, crystals, granules, or any other solid, dry, or semi-dry product.

In accordance with the invention, the mobile tank is incompletely loaded with an at least partially dehydrated component of the slurry. As used herein, the phase "at least partially dehydrated" includes components that are completely dry, semi-dry, concentrated, or semi-dehydrated. In other words, the slurry is missing at least some of its liquid constituents. For example, if the desired end product is clay slurry, the mobile tank may be partially loaded with dry powdered clay. If the end product is to be a salt slurry, such as those used to substitute for chlorine in a paper making process, the partially dehydrated component of a slurry may be dry salt. Alternatively, the product may be loaded in a hydrated or semihydrated form and a liquid portion thereafter removed.

When the tank is so loaded, the outlet 26 of conduit 22 may be buried in the solids portion. Since propeller 32 is encased within conduit 22, conduit 22 shields propeller 32, and may prevent it from becoming lodged within the solids.

According to the invention, sufficient room is left in the tank for a diluent to be later added and the slurry constituted in the mobile tank. In other words, with respect to FIG. 1, the dehydrated portion of the slurry is initially completely contained within lower region 18 of tanker trailer 12, and the upper region 20 is left empty. The specific demarcation 27 between the upper region and the lower region and the amount of room left empty in the tank, will vary and depending upon the requirements of the slurry to be constituted in the tank. For most slurries, 30–70% of the slurries' transportation weight may be reduced by transporting to a destination only the dry or semi-dry slurry constituents. Indeed, more than half of many slurries' weight is derived from diluent.

In accordance with the invention, after the tank is incompletely loaded, it is transported to a destination, thereby obviating the expense associated with transporting a diluent portion of the slurry. Specifically, since a significant portion of a slurry's weight is derived from liquid such as water, by adding diluent after the tanker trailer 12 is transported to a destination, significant transportation costs may be avoided. Tanker trailer 12 will be lighter during transportation and less fuel will therefore be needed to pull it. In addition, in situations where government regulations limit loaded tanker weights, adding a liquid component of the slurry at a destination will permit higher volumes of slurry to be achieved from a single tanker.

In many case, the diluent may be water added to tank 13 through a hose or other suitable conduit. Preferably, the diluent is added to the upper region 20 of the tank 13 such as through manhole openings 17. The quantity of diluent added will depend upon the volume of solid component contained within the tank and a desired constituency of the slurry.

In accordance with the invention, the slurry is constituted in the mobile tank at the destination by activating an agitator within the mobile tank. Preferably, the agitator is mechanical, having at least one blade. When the method is performed using the apparatus of FIG. 1, the step of constituting may begin as soon as the liquid level in the tank rises to the level of inlets 24 and begins to fill conduit 22. Motor 44 may then be activated to turn propeller 32 and thereby drive diluent with great force through outlet 26. Propeller 32 will be free to turn since it is shielded by conduit 22 from being caked in solids. As motor 44 continues to rotate propeller 32, diluent will be drawn through inlets 24 as illustrated by arrows 50 in FIG. 1. Diluent will thereafter be propelled through outlet 26 into the solids in lower region 18, undermining the solids as indicated by arrows 52. In this way, the contents of tanker trailer 12 will begin to mix. Over time, as the solids are carried by the diluent from the bottom to the top of the tank, an increasingly concentrated mixture will enter conduit 22 through inlets 24. Eventually, a substantially uniform mixture will be achieved, and a slurry will be substantially constituted within trailer 12.

The blades of the propeller are very effective in moving high volumes of liquid from the top to the bottom of the tank. However, other agitators, including agitators with numerous other constructions and/or blade arrangements might be used to perform the method of the invention.

For most efficient mixing, a controller 52 may be provided to selectively activate each of hydraulic motors 44, one at a time. Baffles 15 prevent solids from one section of the tank 13 to migrate into an adjoining section. Thus, each hydraulic motor may be activated for a time sufficient to ensure that the contents of each compartment are blended into a homogeneous slurry. Once each compartment is sequentially blended, controller 52 may then simultaneously activate all of motors 44.

Due to the sloped shape of the bottom of the tanker in combination with the driving force of the fluid through conduit 22, there is preferably no location within tanker 12 where solids will be free to cake. Thus, while the invention may be used with tankers which do not have sloped floor portions, the use of a tank with sloped floor portions provides the added benefit of ensuring that substantially all of the solids will become part of the slurry mixture.

After the slurry is constituted in the mobile tank 13, it may be off-loaded either by gravity or with the assistance of one or more pumps. Off-loading may be achieved by tapping outlets 54 at the bottom of each floor cone 14.

The mechanical agitator illustrated in the figures is particularly effective because it draws the lightest liquid off the top of the load, down the conduit 22, and then the propeller 32 blows it out below the solid's layer and back up along the walls of the tank 13. This undermines the solids and provides a quicker blending. Conduit 24 therefore serves two functions. It ensures that liquid is propelled with great force from the bottom towards the top of the solids and it protects the propeller 32 from becoming locked in the solids.

To ensure the best mixing, it is preferable to locate outlet 26 of conduit 22 very close to the floor of the tanker trailer 12. Preferably the outlet 26 of conduit 22 is no more than 6–10 inches from the floor. More preferably, it is located 2–3 inches from the floor. Outlet 26 may be defined by a fully open end of conduit 22. Alternatively, a series of openings or diffuser structure (not shown) may be located in a bottom or lower sides of conduit 22.

In an alternative embodiment (not shown) propeller 32 may be located higher in conduit 22, so long as the outlet 26 of conduit 22 is located near the floor of tank 13, as discussed earlier.

While the fluid conveyor is described in a preferred embodiment as including propeller 32, other structures may be used. For example, a jet ski pump or other high volume, high pressure, fluid conveyors may be used. Thus, the invention is, in its broadest sense, not limited to any particular conveyor.

The invention may have significant applicability to a paper making process where high volumes of sodium chlorate are used for bleaching. Both a method and apparatus of the invention, such as previously described, may be used to constitute a salt slurry at a sodium chlorate plant. The invention may then be deployed again, to transport the manufactured sodium chloride to another location, such as a paper plant. Specifically, the heat of the sodium chlorate manufacturing process may be harnessed to dehydrate the sodium chlorate, reducing it to a powder. The sodium chlorate powder may then be loaded in at least partially dehydrated form into a mobile tank. While preferably leaving sufficient room in the mobile tank to later add a diluent (e.g., water) to reconstitute the sodium chlorate slurry in the mobile tank. Then, the incompletely loaded tank may be transported to a paper making plant, where water is added to the tank and the slurry reconstituted using a mechanical agitation device such as the ones previously referred to. The slurry can then be off-loaded directly into the paper making factory or into a holding tank for later use.

The apparatus and method have been described in connection with over-the-road tanker trailers. However, the invention is not so limited. For example, the invention could be used in association with a hopper railcar in which four 50-hpr motors may be used to drive the system, one located in each compartment. Each motor may, for example, be connected to a gear reduction box. Significant economic advantages may also be realized by transporting partially dehydrated components of slurry in an ocean-going vessel and constituting the slurry in the ocean-going vessel before off-loading. In this manner, the cost of transporting water overseas may be substantially eliminated.

The invention may be employed using a single conduit/propeller arrangement in a tank, or multiple conduit/propeller arrangements such as the embodiment illustrated in FIG. 1. In addition, the conduit/propeller arrangement illustrated in FIGS. 2A and 2B may be used in connection with mobile tanks having shapes other than those illustrated in FIG. 1. For example, it can be used in connection with a drop bottom tanker, a conventional conical tanker, a straight tubular tanker, pneumatic tanker, or any other tank.

In an alternative embodiment of the invention, the mobile tank may be completely filled with the dehydrated portion of the slurry or may be filled to a level not providing sufficient room for the slurry to be reconstituted in the tank. In such instances, an excess portion of the dehydrated component can be removed at the destination to make sufficient room for diluent to be added. Thereafter, when the constituted slurry is removed from the tank, the excess may be reintroduced into the tank, and the mobile tank used to constitute another batch of slurry.

It will be apparent to those skilled in the art that various other modifications and variations can be made to the structure and methodology of the present invention without departing from the scope and spirit of the invention. In view of the foregoing, it is intended that the invention cover modifications and variations of this invention provided they fall within the scope of the following claims and their equivalents.

What is claimed is:

1. A method of minimizing the delivery cost of a slurry, the method comprising:
    incompletely loading a mobile tank with an at least partially dehydrated component of the slurry, wherein said incompletely loading comprises introducing said at least partially dehydrated component of the slurry into the mobile tank;
    leaving sufficient room in the tank for a diluent to be later added and the slurry constituted in the mobile tank;
    transporting the incompletely loaded tank containing the at least partially dehydrated slurry component to a destination, thereby obviating expense associated with transporting a diluent portion of the slurry;
    adding diluent to the mobile tank at the destination;
    constituting the slurry in the mobile tank after reaching the destination by activating a mechanical agitator within the mobile tank;
    maintaining the diluent and the at least partially dehydrated component in the tank while the slurry is constituted; and
    off-loading slurry from the tank.

2. A method according to claim 1, wherein sufficient room is left in the tank so that the weight of the diluent added at the destination is between 30% and 70% of the weight of the at least partially dehydrated component of the slurry.

3. A method according to claim 1, wherein the mechanical agitator conveys diluent along a path from a top portion of the tank toward a bottom portion of the tank.

4. A method according to claim 3, wherein the agitator includes at least one blade for propelling diluent toward the bottom portion of the tank.

5. A method according to claim 1, wherein the at least partially dehydrated component is salt and the slurry is a salt slurry.

6. A method according to claim 5, wherein the off-loading occurs at a sodium chlorate plant.

7. A method according to claim 1, wherein the at least partially dehydrated component includes dry powdered clay and the slurry is a clay slurry.

8. A method of claim 1, wherein the off-loading occurs with the assistance of a pump.

9. A method according to claim 1, wherein the at least partially dehydrated component is in granular form.

10. A method according to claim 1, wherein the at least partially dehydrated component is in crystalline form.

11. A method according to claim 1, wherein the at least partially dehydrated component is in powder form.

12. A method according to claim 1, wherein the agitator includes a series of blades radiating from a hub.

13. A method of minimizing the delivery cost of a slurry, the method comprising:
    incompletely loading a mobile tank with an at least partially dehydrated component of the slurry, wherein said incompletely loading comprises introducing said at least partially dehydrated component of the slurry into the mobile tank;
    leaving sufficient room in the tank for a diluent to be later added and the slurry constituted in the mobile tank;
    transporting the incompletely loaded tank containing the at least partially dehydrated slurry component to a destination, thereby obviating expense associated with transporting a diluent portion of the slurry;
    adding diluent to the mobile tank at the destination;
    constituting the slurry in the mobile tank after reaching the destination by activating a mechanical agitator within the mobile tank, wherein the agitator includes a fluid conveyor having an inlet in an upper portion of the tank and an outlet in a lower portion of the tank; and
    off-loading slurry from the tank.

14. A method according to claim 13, wherein the fluid conveyor includes an elongated conduit and propeller located within the conduit.

15. A method according to claim 14, wherein the fluid conveyor includes a shaft coupled at one end thereof to the propeller and at an opposite end thereof to a motor, the shaft extending at least partially through the conduit.

16. A method of minimizing the delivery cost of a slurry, the method comprising:

incompletely loading a mobile tank with an at least partially dehydrated component of the slurry, wherein said incompletely loading comprises introducing said at least partially dehydrated component of the slurry into the mobile tank;

leaving sufficient room in the tank for a diluent to be later added and the slurry constituted in the mobile tank;

transporting the incompletely loaded tank containing the at least partially dehydrated slurry component to a destination, thereby obviating expense associated with transporting a diluent portion of the slurry;

adding diluent to the mobile tank at the destination;

constituting the slurry in the mobile tank after reaching the destination by activating a mechanical agitator within the mobile tank; and off-loading slurry from the tank, wherein the at least partially dehydrated component is salt and the slurry is a salt slurry, and wherein sodium chlorate is manufactured using the off-loaded salt slurry and thereafter manufactured sodium chlorate in substantially dry form is again loaded into a mobile tank, transported to a final destination where a further diluent is added to the tank, the tank contents are agitated to form a sodium chlorate slurry, and the sodium chlorate slurry is flowably off-loaded from the tank.

17. A method of minimizing the delivery cost of a slurry, the method comprising:

incompletely loading a mobile tank with an at least partially dehydrated component of the slurry, wherein said incompletely loading comprises introducing said at least partially dehydrated component of the slurry into the mobile tank;

leaving sufficient room in the tank for a diluent to be later added and the slurry constituted in the mobile tank;

transporting the incompletely loaded tank containing the at least partially dehydrated slurry component to a destination, thereby obviating expense associated with transporting a diluent portion of the slurry;

adding diluent to the mobile tank at the destination;

constituting the slurry in the mobile tank after reaching the destination by activating a mechanical agitator within the mobile tank, wherein the agitator includes a series of blades radiating from a hub and wherein the blades and the hub are contained within a conduit; and off-loading slurry from the tank.

18. A method according to claim 17, wherein the tank is elongated in a first direction and wherein the conduit has an elongated axis extending in a second direction transverse to the first direction.

19. A method of delivering at least one component of salt slurry to a sodium chlorate plant, the method comprising:

loading a quantity of substantially dry, loose salt into a mobile tank, the quantity filling substantially less than the entire mobile tank, wherein said loading comprises introducing said quantity of substantially dry, loose salt into the mobile tank;

transporting the mobile tank containing the quantity of substantially dry, loose salt to a destination;

introducing, at the destination, liquid into the mobile tank;

mixing in the mobile tank, using a mechanical agitator having at least one mixing blade, the liquid with the loose salt to thereby form a salt slurry having a substantially uniform consistency;

maintaining the liquid and the loose salt in the tank while the slurry is formed; and off-loading the salt slurry for use in the sodium chlorate plant.

20. A method according to claim 19, wherein the mobile tank is part of a vehicle chosen from a group consisting of tanker trailers, railcar tankers, ISO containers, and water-going vessels.

21. A method according to claim 19, further comprising the step of shipping the dry, loose salt on a water-going vessel and wherein the step of introducing includes adding liquid to the tank on the water-going vessel.

22. A method according to claim 19, wherein the destination is a location geographically near a paper mill.

23. A method according to claim 19, wherein the liquid is water.

24. The method according to claim 19, wherein the destination is at a paper mill.

25. A method of minimizing the delivery cost of a slurry, the method comprising:

incompletely loading a mobile tank with an at least partially dehydrated component of the slurry, wherein said incompletely loading comprises introducing said at least partially dehydrated component of the slurry into the mobile tank;

leaving sufficient room in the tank for a diluent to be later added and the slurry constituted in the mobile tank;

transporting the incompletely loaded tank containing the at least partially dehydrated slurry component to a destination, thereby obviating expense associated with transporting a diluent portion of the slurry;

adding diluent to the mobile tank at the destination; and constituting the slurry in the mobile tank after reaching the destination by conveying diluent through a conduit from a location in an upper region of the tank to a location beneath a phase boundary between the diluent and the slurry component to thereby undermine the slurry component and cause the diluent to mix with the slurry component, wherein the conduit is located within the tank.

26. The method according to claim 24, further comprising maintaining the diluent and the slurry component in the tank while the slurry is constituted.

27. The method according to claim 24, wherein the conveying through the conduit within the tank causes substantially all of the mixing of the diluent and the slurry component.

28. A method of minimizing the delivery cost of a slurry, the method comprising:

incompletely loading a mobile tank with an at least partially dehydrated component of the slurry, wherein said incompletely loading comprises introducing said at least partially dehydrated component of the slurry into the mobile tank;

leaving sufficient room in the tank for a diluent to be later added and the slurry constituted in the mobile tank;

transporting the incompletely loaded tank containing the at least partially dehydrated slurry component to a destination, thereby obviating expense associated with transporting a diluent portion of the slurry;

adding diluent to the mobile tank at the destination;

constituting the slurry in the mobile tank after reaching the destination by activating a mechanical agitator within the mobile tank, the activation of the mechanical agitator agitating the diluent and the at least partially dehydrated component, wherein the mechanical agitator causes substantially all of the agitation of the diluent and the at least partially dehydrated component while the slurry is constituted; and off-loading slurry from the tank.

29. A method of delivering at least one component of salt slurry to a sodium chlorate plant, the method comprising:

loading a quantity of substantially dry, loose salt into a mobile tank, the quantity filling substantially less than the entire mobile tank, wherein said loading comprises introducing said quantity of substantially dry, loose salt into the mobile tank;

transporting the mobile tank containing the quantity of substantially dry, loose salt to a destination;

introducing, at the destination, liquid into the mobile tank;

mixing in the mobile tank, using a mechanical agitator having at least one mixing blade, the liquid with the loose salt to thereby form a salt slurry having a substantially uniform consistency, wherein the mechanical agitator causes substantially all of the mixing of the liquid and the salt while the slurry is formed; and off-loading the salt slurry for use in the sodium chlorate plant.

* * * * *

UNITED STATES PATENT AND TRADEMARK OFFICE
CERTIFICATE OF CORRECTION

PATENT NO.    : 6,443,613 B1
DATED         : September 3, 2002
INVENTOR(S)   : Robert Rumph It is certified that error appears in the above-identified patent and that said Letters Patent is hereby corrected as shown below:

Column 10,
Lines 44 and 47, please replace "24" with -- 25 --.

Signed and Sealed this

Seventeenth Day of December, 2002

JAMES E. ROGAN
*Director of the United States Patent and Trademark Office*